Figure 1:
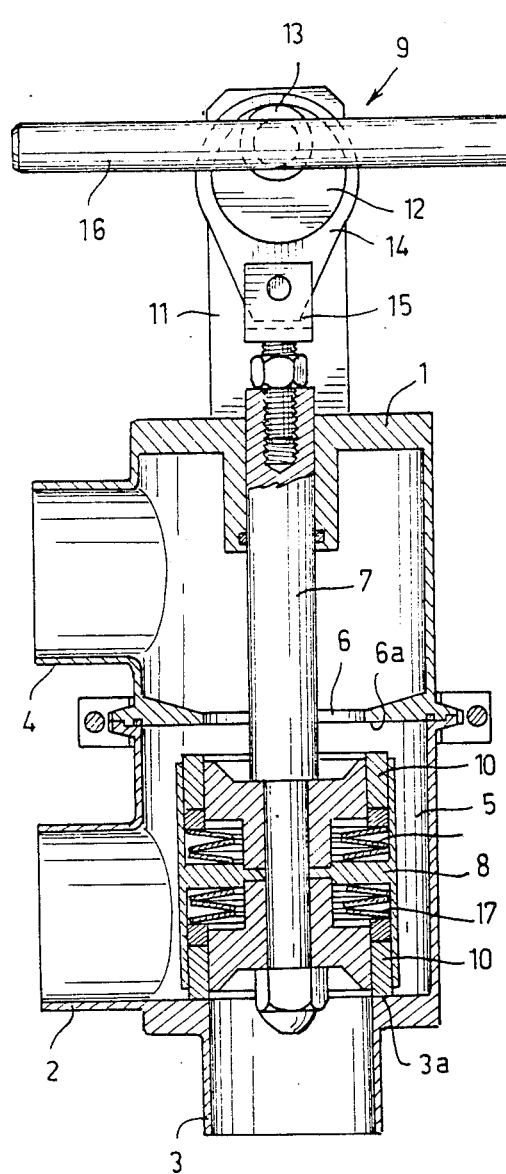

United States Patent [19]

Niskanen

[11] Patent Number: 4,586,538

[45] Date of Patent: May 6, 1986

[54] SPINDLE VALVE FOR A TUBE SYSTEM FOR LIQUIDS

[75] Inventor: Erkki P. Niskanen, Helsinki, Finland

[73] Assignee: Erkki Niskanen Oy, Helsinki, Finland

[21] Appl. No.: 608,571

[22] Filed: May 9, 1984

[30] Foreign Application Priority Data

May 10, 1983 [FI] Finland ................................ 831615

[51] Int. Cl.⁴ .................... F16K 11/044; F16K 25/00; F16K 31/524
[52] U.S. Cl. .................................. 137/625.5; 251/85; 251/251
[58] Field of Search .................... 251/251, 85, 84, 176, 251/77, 263, 314; 137/625.5; 451/84

[56] References Cited

U.S. PATENT DOCUMENTS

| | | | |
|---|---|---|---|
| 261,224 | 7/1882 | Groshon | 137/625.5 |
| 645,696 | 3/1900 | Topp | 137/625.5 X |
| 845,119 | 2/1907 | Pitman | 251/251 |
| 865,568 | 9/1907 | Cooper | 251/251 |
| 1,034,882 | 8/1912 | Crane | 251/85 X |
| 1,245,233 | 11/1917 | Hynes | 137/625.5 X |
| 2,645,451 | 7/1953 | Gladder | 137/625.5 |
| 2,952,439 | 9/1960 | Koons | 251/357 |
| 3,534,772 | 10/1970 | Stampfli | 251/85 X |
| 3,542,333 | 11/1970 | Stampfli | 251/85 |
| 4,526,200 | 7/1985 | Niskanen | 137/625.47 |

OTHER PUBLICATIONS

Brochure from 1972 (Pressure Air Operated Valve SRC) Manufactured by Alfa-Laval, Sweden.

Primary Examiner—Martin P. Schwadron
Assistant Examiner—John S. Starsiak, Jr.
Attorney, Agent, or Firm—Cushman, Darby & Cushman

[57] ABSTRACT

A spindle valve for a pipe system for liquids, which valve comprises a frame (1) provided with an inlet connection (2) and at least one outlet connection (3,4) and a valve housing (5) separating the connections from each other, and a spindle (7) mounted axially slidably in the frame and provided with a valve member (8). A closing surface (3a, 6a) cooperating with the valve member is formed in the valve housing for the outlet connection (3 resp. 4) and actuating means displace the valve member between a closing position pressing against the closing surface and an opening position raised from the closing surface in order to close and to open respectively the flow path between the connections. The valve is provided with a locking device for locking the spindle axially undisplaceably at least in the closing position, in order to prevent unintentional opening of the flow path.

6 Claims, 4 Drawing Figures

SPINDLE VALVE FOR A TUBE SYSTEM FOR LIQUIDS

The present invention relates to a spindle valve for a tube system for liquids, which valve comprises a frame provided with an inlet connection and at least one outlet connection and a valve housing separating said connections from each other, a spindle mounted axially slidably in the body and provided with a valve member, a closing surface cooperating with the valve member and formed in the valve housing for the outlet connection, and actuating means for displacing the valve member between a closing position pressing against the blocking surface and an opening position elevated from the blocking surface in order to close and to open respectively the flow path between the connections.

In the food industry, such as dairies, liquids must be transported by means of a tube system between different processing and storing steps, whereby the flow of liquids in the tube system is controlled by means of switch valves mounted in the tube system. A switch valve operates as a so-called two-way valve, in which the valve member always closes the flow path for the liquid from the inlet connection to either one of the outlet connection and correspondingly opens the flow path from the inlet connection to the other outlet connection. The spindle actuating the valve member is usually operated by means of pressure air so that the spindle can be displaced by means of pressure air to one extreme position, in which one flow path is closed and the other flow path is open, and by means of a return spring to another extreme position, in which said one flow path is open and said other flow path is closed. The drawback of such a valve construction is, however, that the spring operated valve member can open unintentionally against the action of the spring because of pressure shocks appearing in the tube system, whereby situations momentarily occur when both flow paths are open simultaneously, which is contrary to the operation principle of such a valve and can cause even considerable damage, particularly in the food industry. The spring operated valve member is closed suddenly and can cause inconvenient pressure shocks in the tube system.

The object of the present invention is to provide a valve which eliminates the above drawback and makes it possible to maintain the valve member reliably closed also when pressure shocks occur. This object is achieved with a valve according to the invention, which is characterized in that the valve is provided with an actuating device where the spindle is axially undisplaceably at least in said closing position.

The invention is based on the idea that the movement of the spindle is carried out by means which provide a forced mechanical securing of the spindle in the closing position in the extreme position of the movement of the spindle. An eccentric, a double wedge, a screw or the like can be used as such means. The actuating devices can be made manually-controlled or pressure medium operated so that the moving and locking of the valve spindle can be carried out, e.g., by remote control. The movement of the spindle is controlled and the closing and opening occurs smoothly thanks to the form of the eccentric, so that no pressure shocks are caused in the tube system.

It is preferable that there the valve member is a valve plate, which is provided with an axially flexible collar-like sealing ring for each outlet connection.

The invention can in its most simple form be adapted to a spindle valve provided with one inlet connection and one outlet connection and only one flow path which can be opened and closed.

Figure 2:
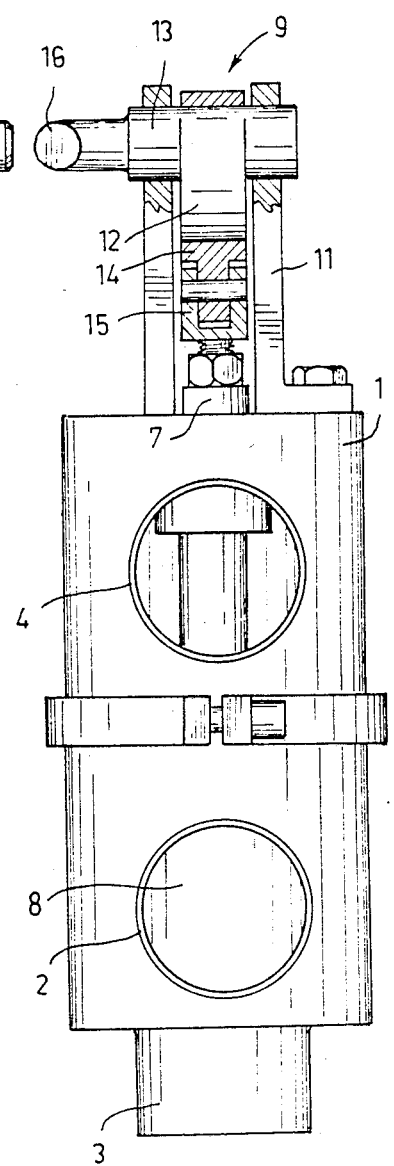
Figure 3:
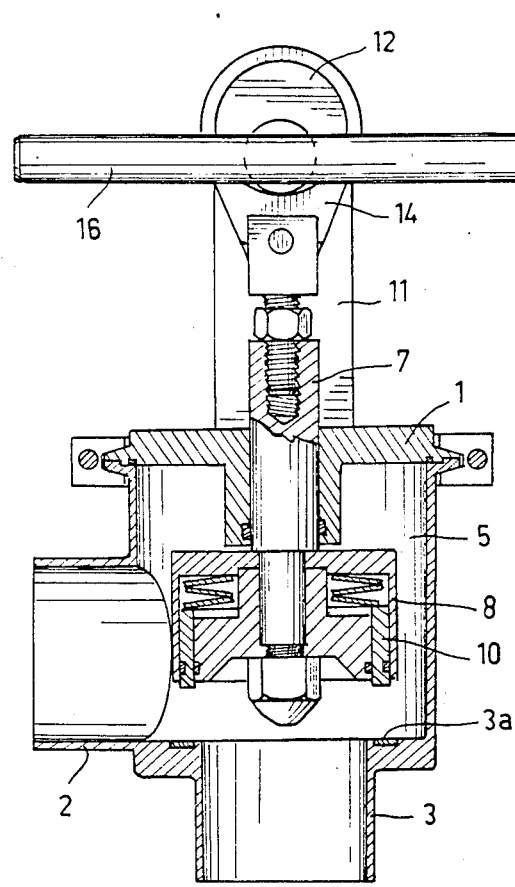
Figure 4:
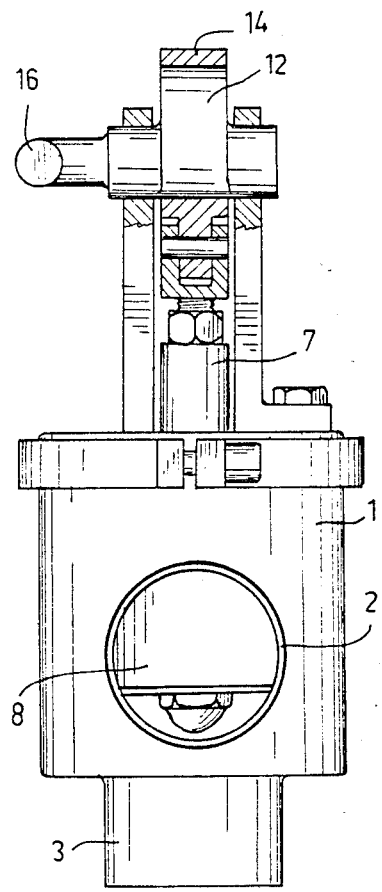

The invention is described in more detail in the following with references to the enclosed drawings, wherein FIGS. 1 and 2 illustrate an axial section and a side view respectively of a switch valve according to a first embodiment of the invention, and FIGS. 3 and 4 illustrate in a corresponding manner a valve according to a second embodiment.

In FIGS. 1 and 2 of the drawings a switch valve for e.g. dairies is illustrated, which valve comprises a frame 1 which forms three pipe connections, i.e. an inlet connection 2, a return connection 3 and an outlet connection 4. The inlet and return connections are in direct contact with a valve chamber 5 in the frame, while the outlet connection is in contact with the valve chamber through an outlet port 6.

A spindle 7 is mounted axially slidably in the body concentrically with the return connection and the outlet port. A cylindrical valve member 8 is attached to that end of the spindle which extends into the valve housing. The end of the spindle extending outside the frame is connected to an adjusting and actuating device 9.

The valve member is provided with two collar-like sealing rings 10, e.g. of teflon, extending in opposite directions, which rings are pressed by the movement of the spindle alternatively against a ring-shaped closing surface 3a of the return connection or against a ring-shaped closing surface 6a of the outlet port so that two flow paths separated from each other are formed in the frame, i.e. flow paths 2-5-3 and 2-5-6-4. The inner diameter of the sealing ring 10 is preferably equal to the inner diameter of the closing surface 3a.

A support 11 is fastened to the frame and an eccentric disc 12 is rotatably mounted on the support by means of pivot shafts 13 so that the rotation axis of the eccentric is positioned perpendicularly to the axis of the spindle. The eccentric disc is surrounded by a loop 14 which is linked to the end of the spindle by means of clamps 15. An operating arm 16 is attached to the other pivot shaft of the eccentric.

The diameter of the eccentric disc is adapted to the distance between the closing surfaces 3a and 6a so that, then the eccentric disc is positioned in the extreme position shown in FIG. 1, the valve member closes the return connection 3 and, when the eccentric is positioned in the opposite extreme position shown in FIG. 3, the valve member closes the outlet port 6.

In order to make possible a slight axial adaption movement of the sealing rings 10, springs 17 are mounted in the valve member for each ring, which springs press the sealing rings flexibly against the closing surface.

It is observed that the valve member can be displaced between its closing and opening positions by moving the spindle by rotating the eccentric disc. In both said positions of the valve member the eccentric disc closes the spindle reliably in an undisplaceable position.

The embodiment of the valve illustrated in FIGS. 3 and 4 differs from the above described embodiment only in that the valve is formed as a one-way valve.

Also in this case, the valve member is reliably locked in its closing position by means of the eccentric device.

The drawings and the description relating thereto are intended only to illustrate the idea of the invention. The valve according to the invention may vary to its details within the scope of the claims. Even if the eccentric disc is illustrated as being manually-controlled in the drawings, the construction can easily be changed, e.g., to be pressure medium operated by connecting the eccentric disc to the piston arm of a pressure medium cylinder for rotating the disc by displacing the piston arm. It is also possible to provide the valve with a mechanism of its own for displacing the spindle and with a separate mechanism for the above-mentioned securing of the spindle.

What is claimed is:

1. A spindle valve for a pipe system for liquids comprising a frame provided with an inlet connection and at least one outlet connection and a valve chamber separating said connections from each other, a spindle mounted axially slidable and non-rotating within the frame, a valve member axially fixed at one end of the spindle, a closing surface formed in the valve chamber cooperating with the valve member for closing the outlet connection, an actuating means for displacing the spindle and valve means between a fixed closed position against the closing surface and an open position spaced from the closing surface, said actuating means preventing axial movement of the spindle and the valve member when in the closed position, the valve member being further provided with an axially mounted spring biased sealing ring which when the valve member is in the closed position engages the closing surface, the inner diameter of said sealing ring corresponding to the inner diameter of said closing surface.

2. A valve according to claim 1, in which the frame is provided with two outlet connections connected to the valve chamber and a closing surface positioned coaxially with respect to the spindle in the frame corresponding to each outlet connection, whereby the valve member is double-acting so that, when the valve member is positioned in the open position with respect to one outlet connection, the valve member is simultaneously positioned in the closed position with respect to the outer outlet connection.

3. A valve according to claim 1, characterized in that the actuating means is an eccentric mechanism.

4. A valve according to claim 1, characterized in that the actuating means comprises an eccentric disc which is pivotally mounted in the frame around an axis perpendicular to the axis of the spindle and is connected to the spindle so that the rotation movement of the eccentric disc causes an axial movement of the spindle, whereby the eccentric disc is of such dimensions that said movement of the spindle corresponds in the extreme positions of the eccentric disc to said closing positions and opening position respectively of the valve member.

5. A spindle valve for a pipe system for liquids, comprising; a frame provided with an inlet connection and at least one outlet connection and a valve chamber separating said connections from each other, a spindle mounted axially slidable and non-rotatable in the frame and provided with a valve member axially fixed at one end of the spindle, a closing surface formed in the valve chamber and cooperating with the valve member for closing the outlet connection, an actuating means for displacing the valve member and capable of maintaining the valve member in a fixed closed and a fixed open position thereby preventing displacement of the valve member due to pressure shocks in the pipe system, the valve member being provided with an axially spring biased collar-like sealing ring, which in said closing position of the valve member is pressed against said closing surface, the inner diameter of said sealing ring corresponding to the inner diameter of said closing surface.

6. A spindle valve for a pipe system for liquids comprising; a frame provided with an inlet connection and a first and second outlet connection, a valve chamber separating the inlet and outlet connections, an axially slidably mounted spindle within the frame and having a valve member fixed at one end of the spindle, first and second valve seats diametrically opposed within the chamber cooperating with the valve member such that the valve member is double-acting whereas the valve slides in one direction, one outlet is closed and the other is open, an actuating means for reciprocating the valve member comprising a rotatable eccentric disc mounted on the frame and connected to the spindle such that the spindle and valve member reciprocate as the disc rotates, the valve member having extreme positions within the chamber corresponding to open and closed positions of the valve, the actuating means capable of maintaining the valve member in its extreme positions thereby resisting movement of the valve due to pressure shocks within the pipe system, the valve member being provided with a spring biased sealing ring at each end of the valve member corresponding to the valve seat, the inner diameter of the sealing ring corresponding to the inner diameter of the valve seat.

* * * * *